(12) United States Patent
Kim

(10) Patent No.: US 11,621,478 B2
(45) Date of Patent: Apr. 4, 2023

(54) RADAR APPARATUS MOUNTING ASSEMBLY

(71) Applicant: HL KLEMOVE CORP., Incheon (KR)

(72) Inventor: Sang-Min Kim, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 216 days.

(21) Appl. No.: 16/998,112

(22) Filed: Aug. 20, 2020

(65) Prior Publication Data

US 2021/0057808 A1 Feb. 25, 2021

(30) Foreign Application Priority Data

Aug. 22, 2019 (KR) .................. 10-2019-0102784

(51) Int. Cl.
| | | |
|---|---|---|
| *H01Q 1/32* | (2006.01) | |
| *H01Q 1/42* | (2006.01) | |
| *G01S 7/03* | (2006.01) | |
| *G01S 13/931* | (2020.01) | |
| *G01S 7/02* | (2006.01) | |

(52) U.S. Cl.
CPC ............ *H01Q 1/3291* (2013.01); *G01S 7/03* (2013.01); *G01S 13/931* (2013.01); *H01Q 1/3233* (2013.01); *H01Q 1/42* (2013.01); *G01S 7/027* (2021.05)

(58) Field of Classification Search
CPC .. G01S 7/027; G01S 7/03; H01Q 1/42; H01Q 1/3291; H01Q 1/3233
See application file for complete search history.

(56) References Cited

U.S. PATENT DOCUMENTS

| | | | | |
|---|---|---|---|---|
| 5,670,745 | A * | 9/1997 | Yajima ................... | H01Q 1/526 220/327 |
| 9,673,517 | B2 * | 6/2017 | Tran ......................... | H01Q 1/42 |
| 10,044,099 | B2 * | 8/2018 | Leung ................. | H01Q 21/0075 |
| 10,074,907 | B2 * | 9/2018 | Ding .................... | H01Q 1/3233 |
| 10,173,623 | B1 * | 1/2019 | Meksavan ............... | G01S 13/87 |
| 10,473,754 | B2 * | 11/2019 | Park ......................... | G01S 7/028 |
| 10,793,093 | B2 * | 10/2020 | Callewaert ............. | H01Q 1/422 |
| 2001/0040524 | A1 * | 11/2001 | Suzuki .................... | H01Q 23/00 342/175 |
| 2004/0227663 | A1 * | 11/2004 | Suzuki .................. | G01S 13/931 342/72 |
| 2006/0152406 | A1 * | 7/2006 | Leblanc .................. | H01P 5/107 342/175 |
| 2007/0159380 | A1 * | 7/2007 | Nagaishi ............... | G01S 13/931 257/E25.031 |

(Continued)

FOREIGN PATENT DOCUMENTS

| | | |
|---|---|---|
| JP | 2018-134936 A | 8/2018 |
| KR | 10-2016-0146375 A | 12/2016 |

OTHER PUBLICATIONS

Korean Office Action dated Aug. 13, 2020, in connection with corresponding Korean Patent Application No. 10-2019-0102784.

*Primary Examiner* — Peter M Bythrow
(74) *Attorney, Agent, or Firm* — Hauptman Ham, LLP

(57) ABSTRACT

A radar apparatus mounting assembly in accordance with embodiments of the present disclosure can protect a radar apparatus from an impact applied to a vehicle and prevent a corresponding detection area from being changed by allowing a bracket installed in the vehicle in combination with the radar apparatus to be provided with an elastic structure.

19 Claims, 13 Drawing Sheets

(56) References Cited

U.S. PATENT DOCUMENTS

| | | | |
|---|---|---|---|
| 2007/0216587 A1* | 9/2007 | Schmidt | G01S 7/032 |
| | | | 343/711 |
| 2007/0241962 A1* | 10/2007 | Shinoda | H01Q 1/425 |
| | | | 342/361 |
| 2008/0062038 A1* | 3/2008 | Ouchi | G01S 7/032 |
| | | | 342/175 |
| 2008/0111752 A1* | 5/2008 | Lindackers | H01Q 5/371 |
| | | | 343/872 |
| 2011/0316753 A1* | 12/2011 | Wu | H01Q 1/243 |
| | | | 977/932 |
| 2016/0315376 A1* | 10/2016 | Motomura | H01Q 1/42 |
| 2016/0315377 A1* | 10/2016 | Motomura | H01Q 1/1214 |
| 2017/0104264 A1* | 4/2017 | Kobayashi | H01Q 1/42 |
| 2017/0179584 A1* | 6/2017 | Nakada | H01Q 1/3275 |
| 2018/0034138 A1* | 2/2018 | Wechselberger | H01Q 1/32 |
| 2018/0047528 A1* | 2/2018 | Yamamoto | H01H 9/181 |
| 2018/0109006 A1* | 4/2018 | Ng | H01Q 1/405 |
| 2019/0006733 A1* | 1/2019 | Yasin | H01Q 11/08 |
| 2019/0006744 A1* | 1/2019 | Taira | H01Q 1/3275 |
| 2019/0017531 A1* | 1/2019 | Reinheimer | H01Q 1/12 |
| 2019/0153770 A1* | 5/2019 | Mitchell | E05F 15/73 |
| 2019/0159371 A1* | 5/2019 | Grinsteinner | G01S 7/4813 |
| 2019/0195986 A1* | 6/2019 | Hellinger | G01S 7/032 |

* cited by examiner

RADAR APPARATUS MOUNTING ASSEMBLY

CROSS-REFERENCE TO RELATED APPLICATION

This application claims the priority benefit of Korean Patent Application No. 10-2019-0102784, filed on Aug. 22, 2019 in the Korean Intellectual Property Office, the disclosure of which is incorporated herein by reference in its entirety.

BACKGROUND

1. Technical Field

Embodiments of the present disclosure relates to radar apparatus mounting assemblies, and more specifically, to a radar apparatus mounting assembly capable of protecting a radar apparatus from some impacts and preventing a detection area from being changed by allowing a bracket installed in a vehicle in combination with the radar apparatus to be provided with an elastic structure for absorbing impact.

2. Description of the Related Art

Vehicles are sometimes equipped with an electronic control unit ECU for electronically controlling several types of devices. Such vehicles receive information from sensors or switches installed therein, and then, by processing the received information, perform control functionality for improving vehicle safety and steering feels.

In particular, the vehicles are sometimes equipped with a radar that can detect objects around the vehicles, collect and process information such as a distance from, a relative velocity to, or a direction of, another vehicle, and in turn, send a signal when the vehicle approaches within a predetermined distance.

Such a radar is sometimes installed on a structural frame, or the like in a front or rear portion of a vehicle body; therefore, when an impact is applied to the vehicle, there are possibilities that an installed location of the radar can be changed, and a corresponding detection area can be changed.

In a situation where a large impact is applied to a vehicle, it may be inevitable that an installed location of the radar is changed. However, in typical radar apparatuses, even when a small impact is applied to the vehicle, an installed location of the radar is easily changed; therefore, to restore a corresponding detection area, these radar apparatuses cause an inconvenience of readjusting the location of the radar apparatus, or the like.

SUMMARY

To address these issues, in accordance with embodiments of the present disclosure, a radar apparatus mounting assembly is provided that is capable of protecting a radar apparatus from some impacts and preventing a detection area from being changed by allowing a bracket installed in a vehicle in combination with the radar apparatus to be provided with an elastic structure for absorbing impact.

In accordance with embodiments of the present disclosure, a radar apparatus mounting assembly is provided that includes a radar apparatus, and a bracket including a rear portion facing a rear surface of the radar apparatus, and a first elastic portion bent from the rear portion and coupled to the radar apparatus, and installed in a vehicle.

In accordance with embodiments of the present disclosure, it is possible to protect a radar apparatus from some impacts and prevent a corresponding detection area from being changed by allowing a bracket installed in a vehicle in combination with the radar apparatus to be provided with an elastic structure for absorbing impact.

THE DETAILED DESCRIPTION OF INVENTION

Figure 1:
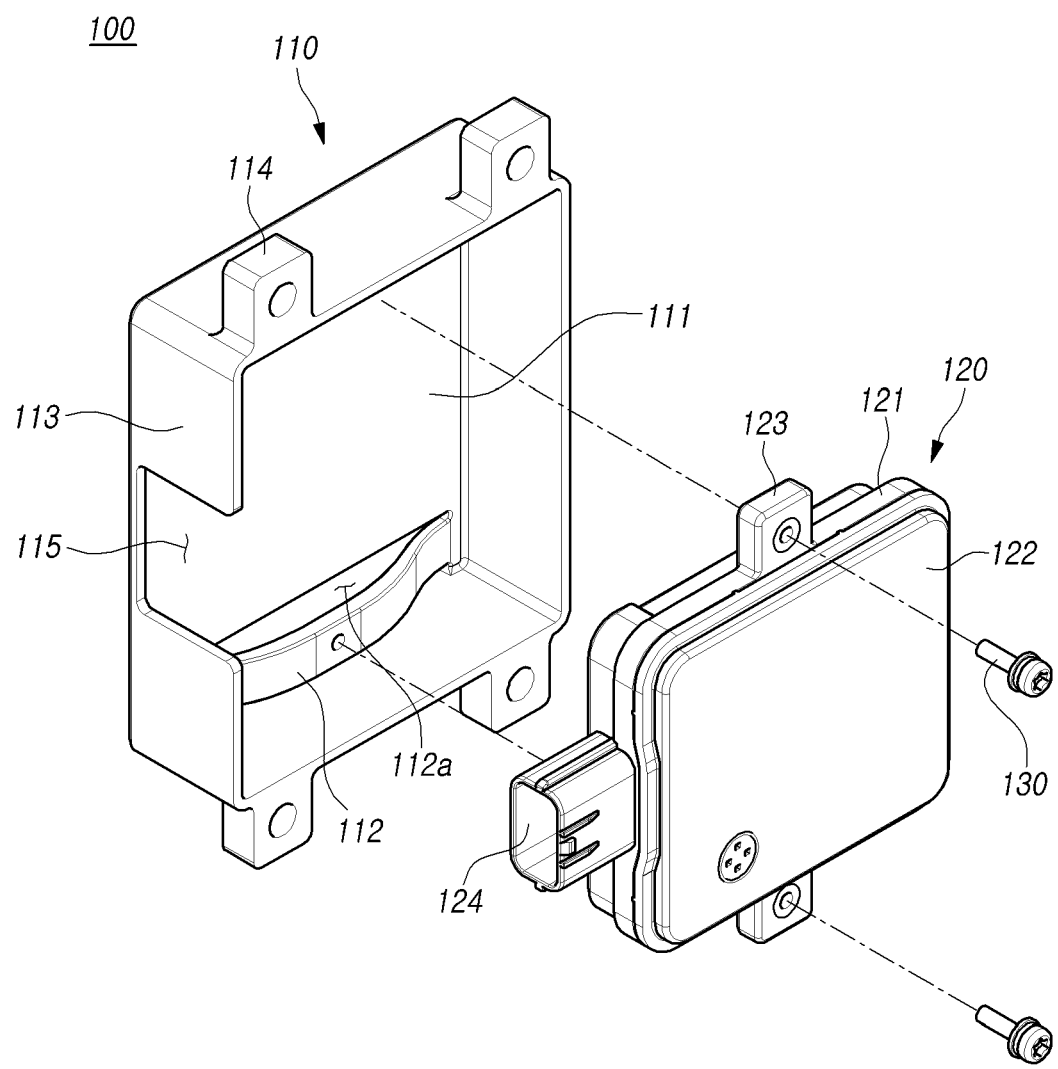
FIG. 1 is an exploded perspective view illustrating a radar apparatus mounting assembly in accordance with embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
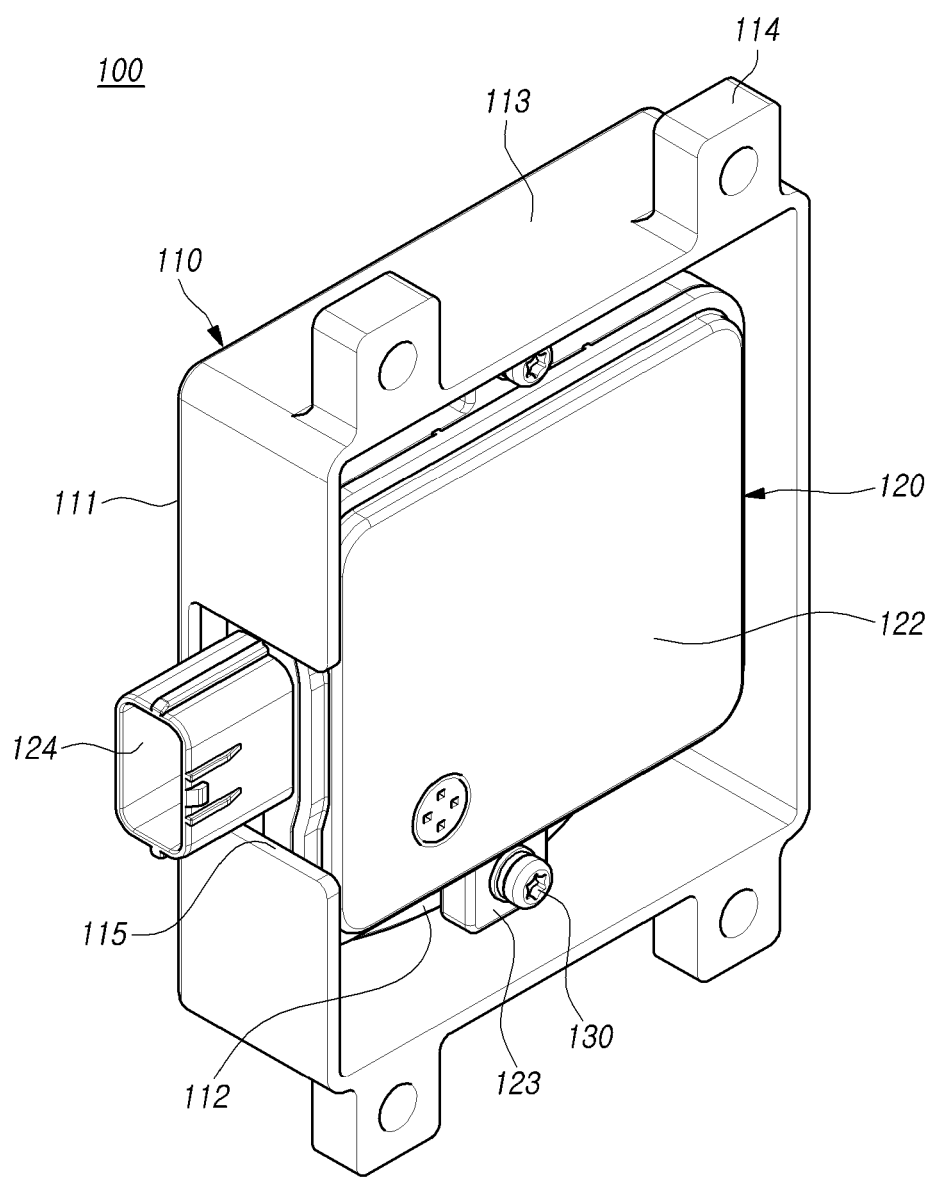
FIG. 2 is a perspective view illustrating a structure of the radar apparatus mounting assembly of FIG. 1 in which a radar apparatus is combined with a bracket in accordance with embodiments of the present disclosure.
Figure 3:
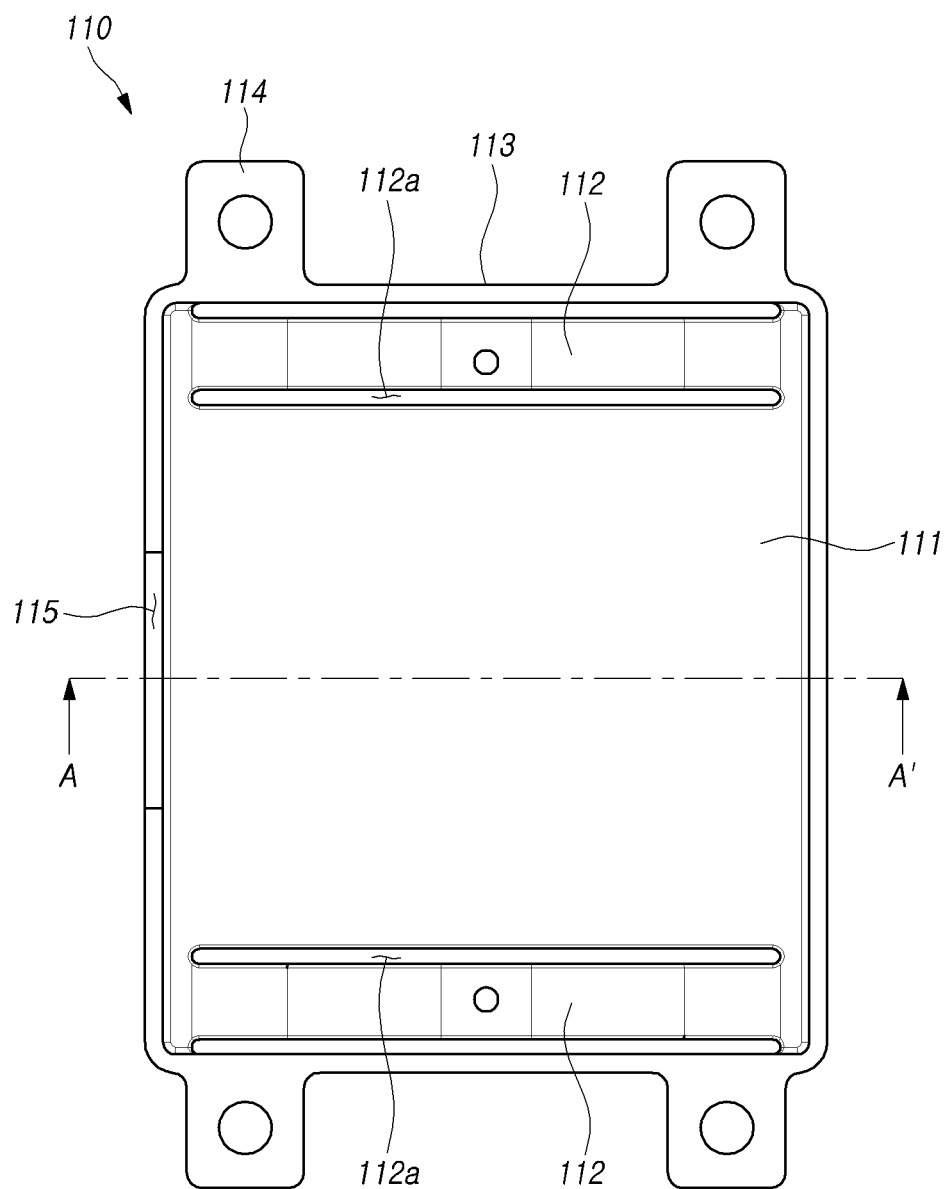
FIG. 3 is a front view illustrating at least a part of the radar apparatus mounting assembly of FIG. 1 in accordance with embodiments of the present disclosure.
Figure 4:
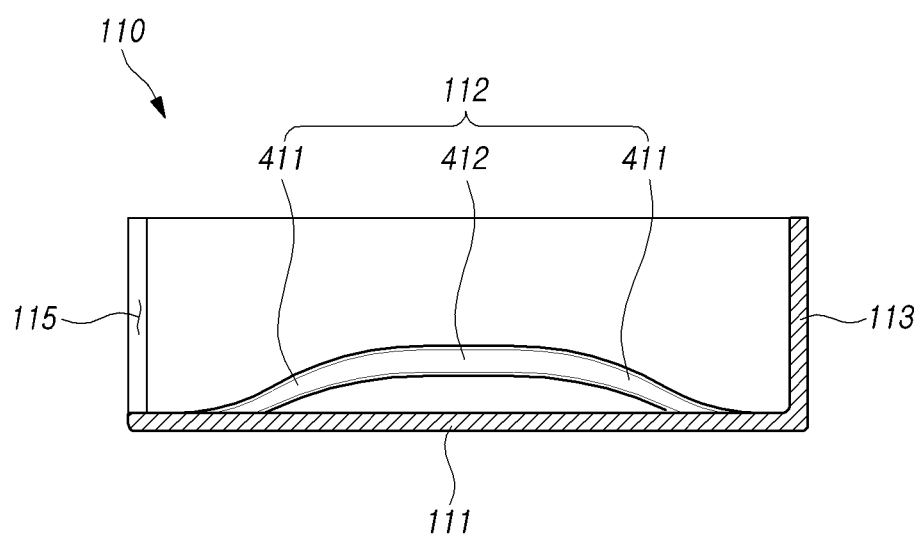
FIG. 4 is a cross-sectional view taken along with line A-A' of FIG. 3.
Figure 5:
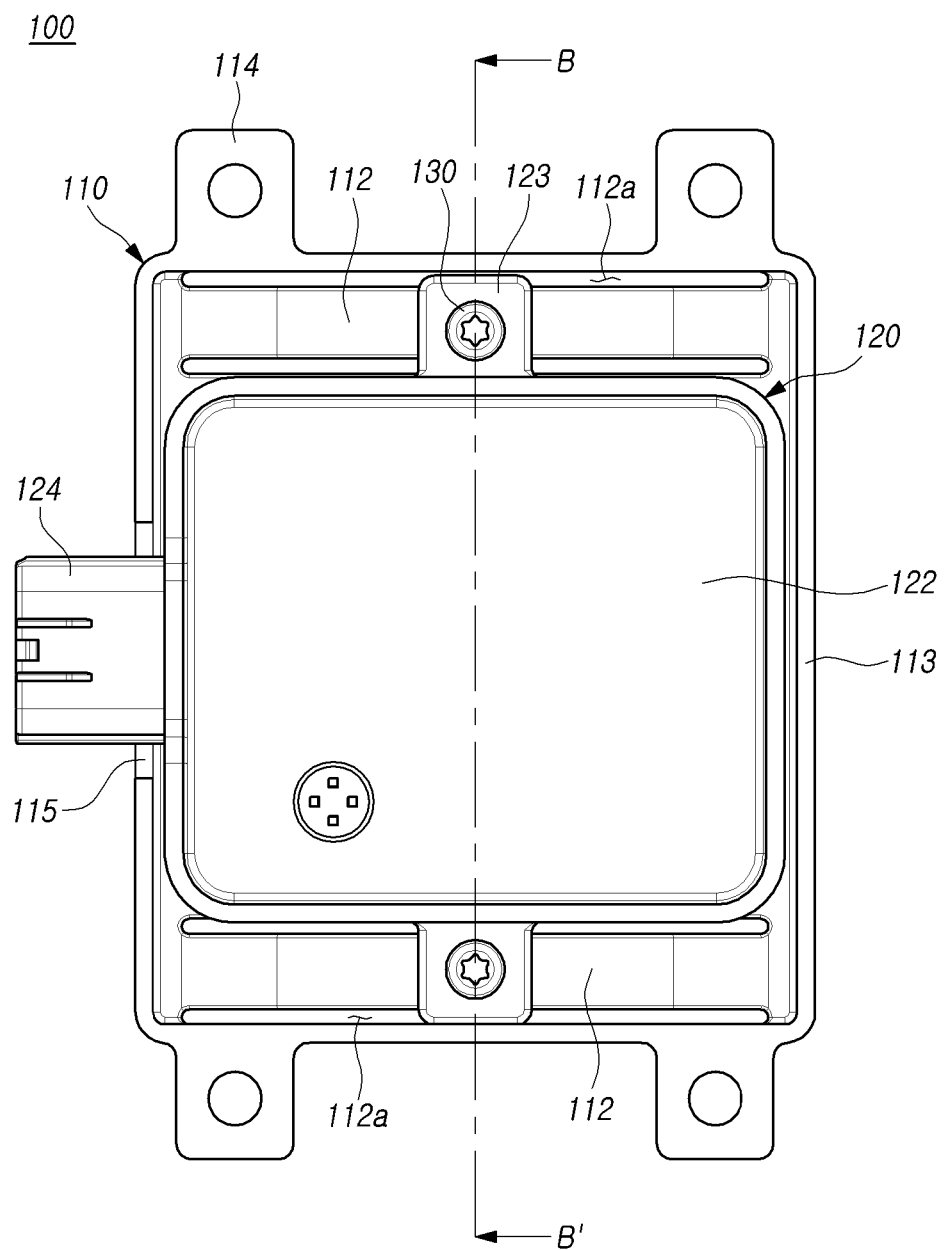
FIG. 5 is a front view of the radar apparatus mounting assembly of FIG. 2.
Figure 6:
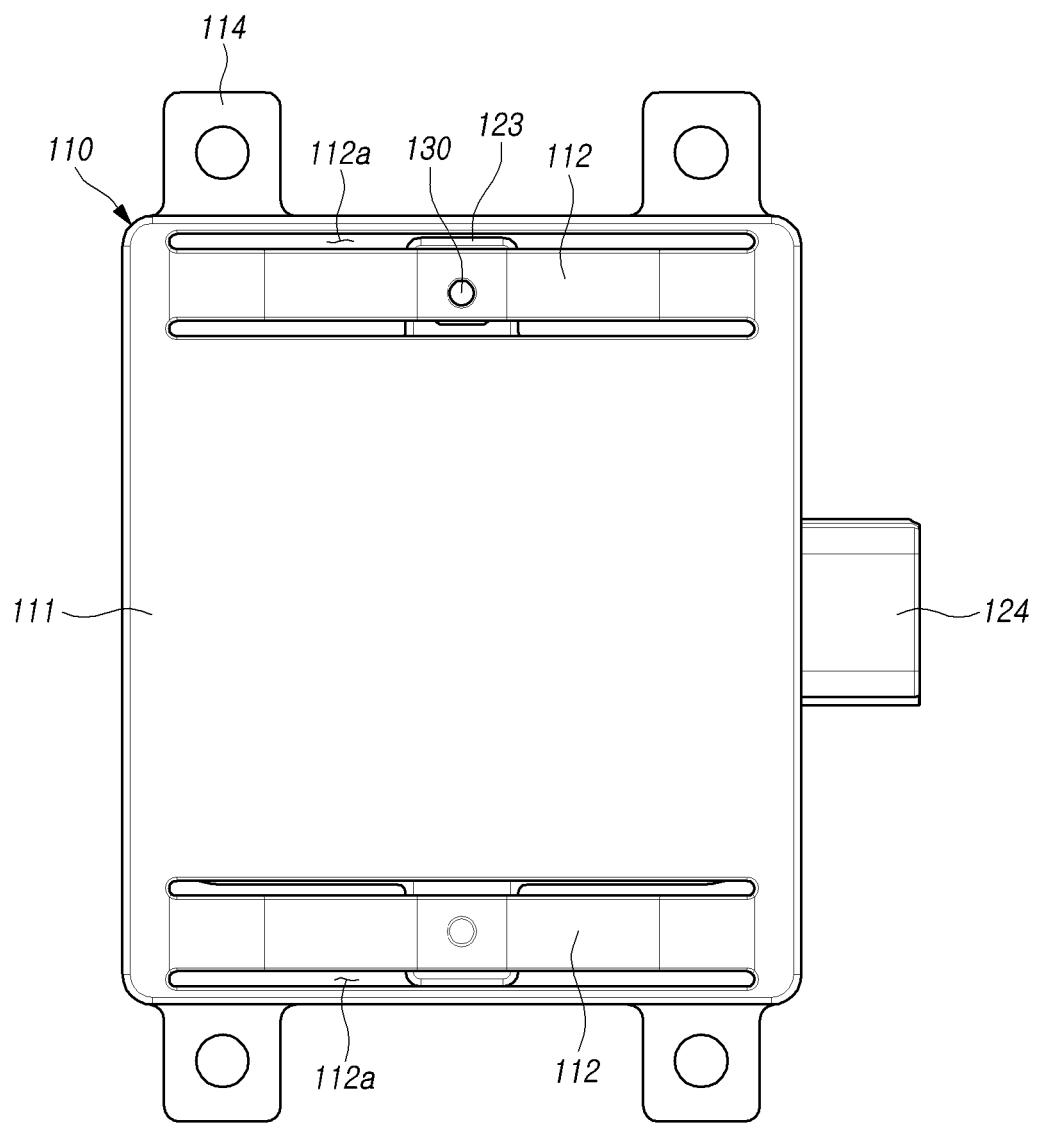
FIG. 6 is a rear view of the radar apparatus mounting assembly of FIG. 5.
Figure 7:
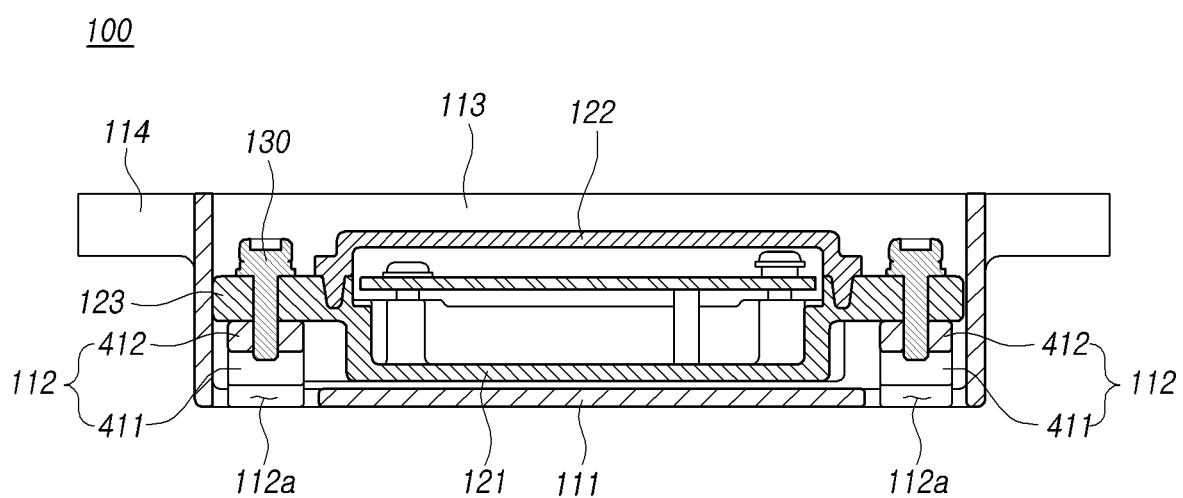
FIG. 7 is a cross-sectional view taken along with line B-B' of FIG. 5.
Figure 8:
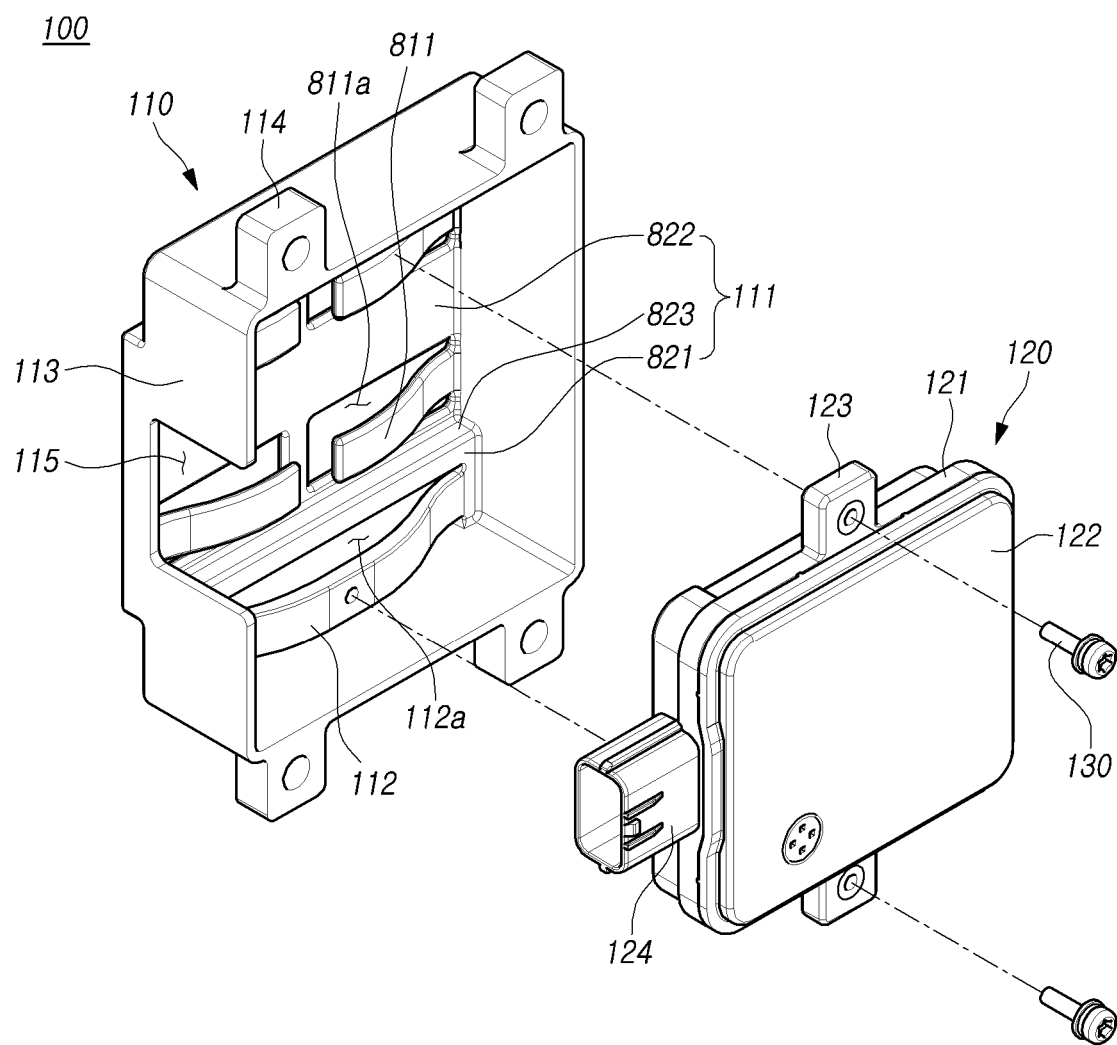
FIG. 8 is an exploded perspective view illustrating a radar apparatus mounting assembly in accordance with embodiments of the present disclosure.
Figure 9:
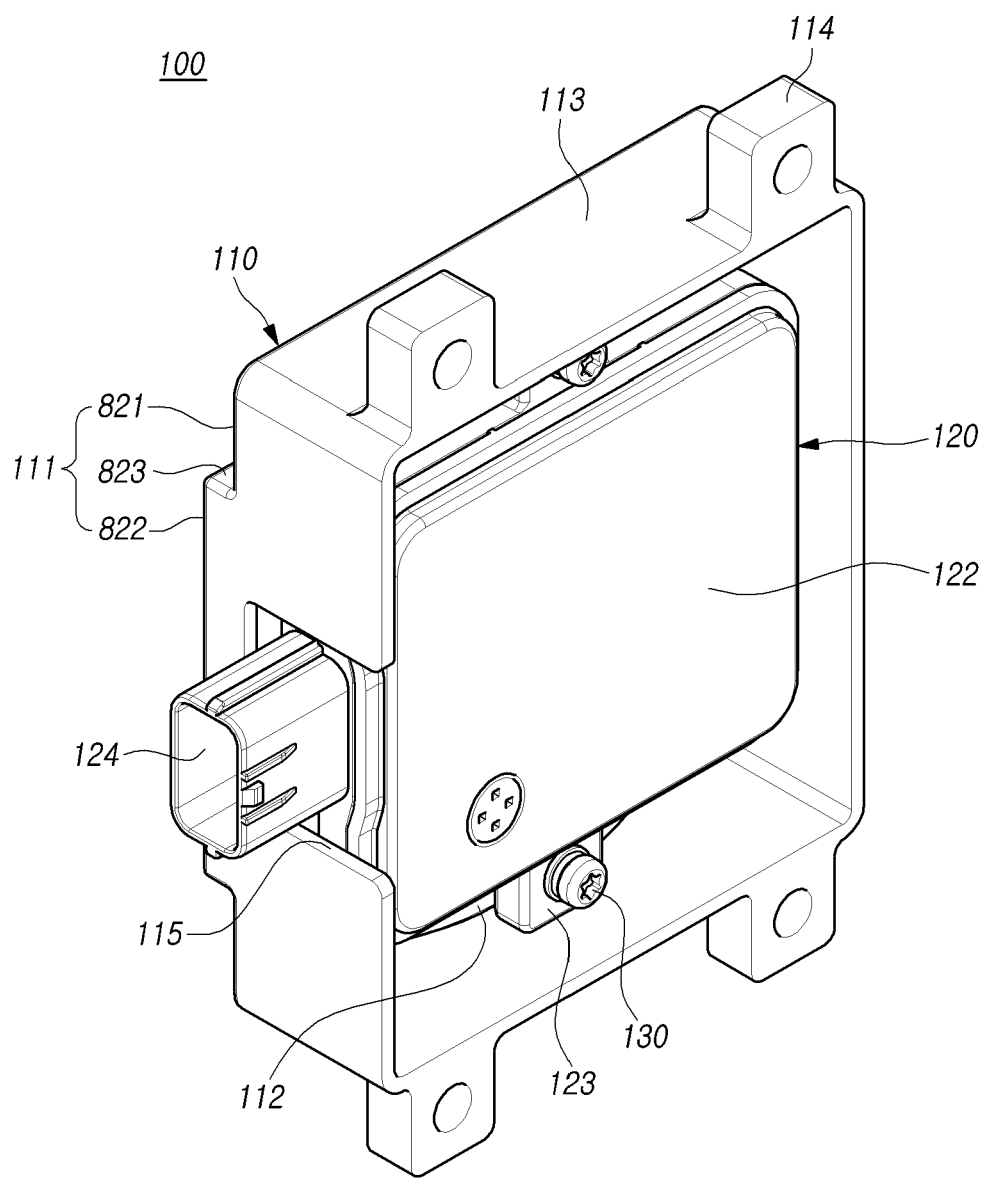
FIG. 9 is a perspective view illustrating a structure of the radar apparatus mounting assembly of FIG. 8 in which a radar apparatus is combined with a bracket in accordance with embodiments of the present disclosure.
Figure 10:
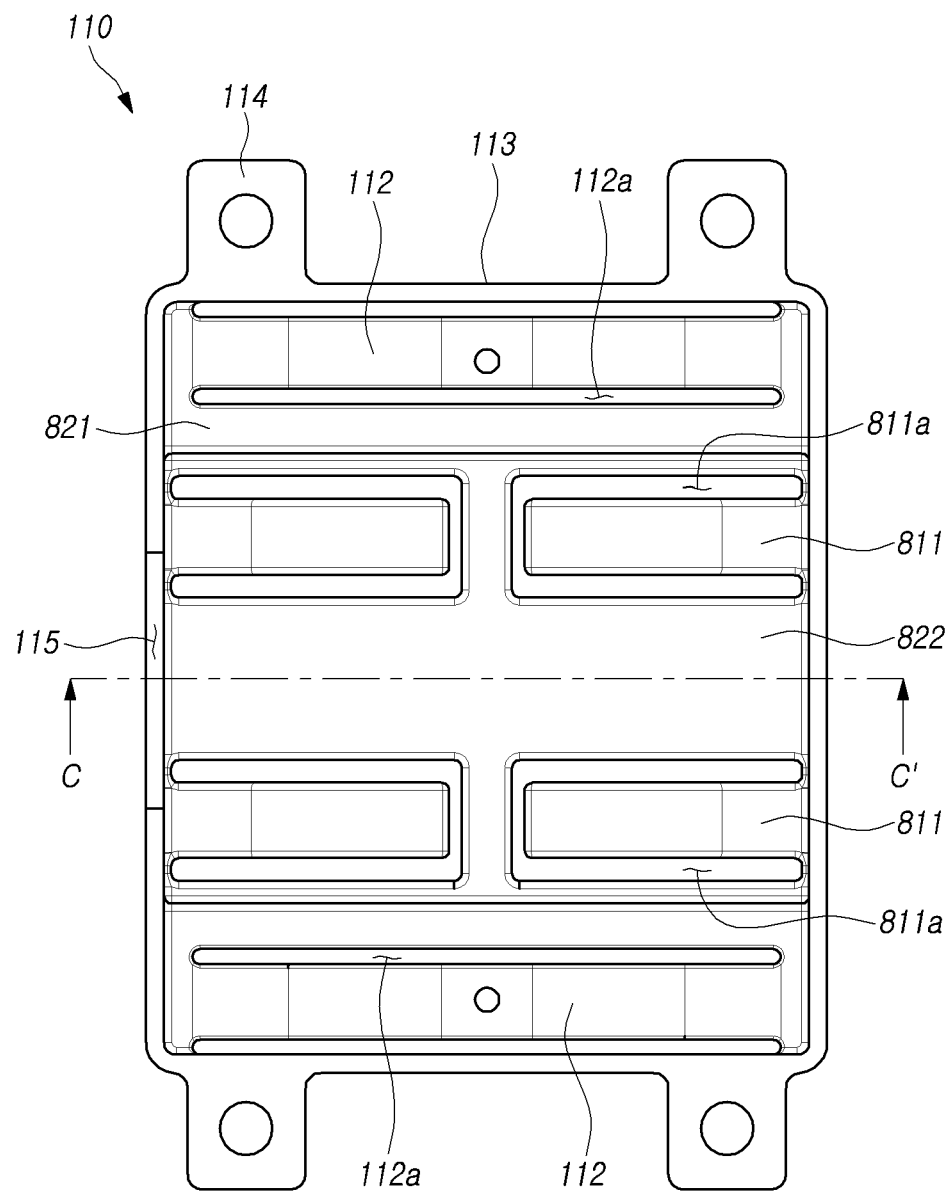
FIG. 10 is a front view illustrating at least a part of the radar apparatus mounting assembly of FIG. 8 in accordance with embodiments of the present disclosure.
Figure 11:
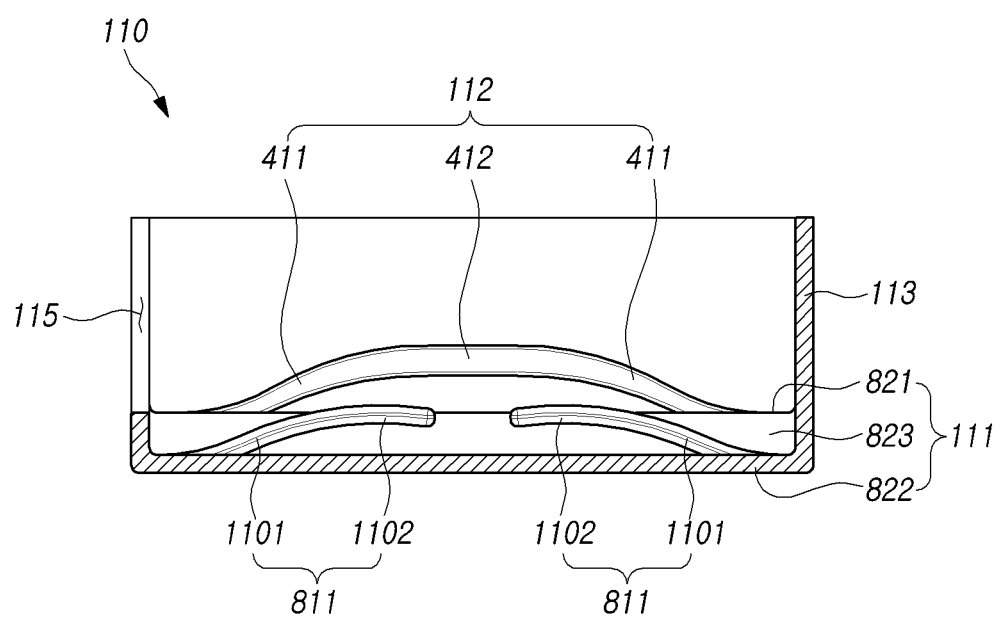
FIG. 11 is a cross-sectional view taken along with line C-C' of FIG. 10.
Figure 12:
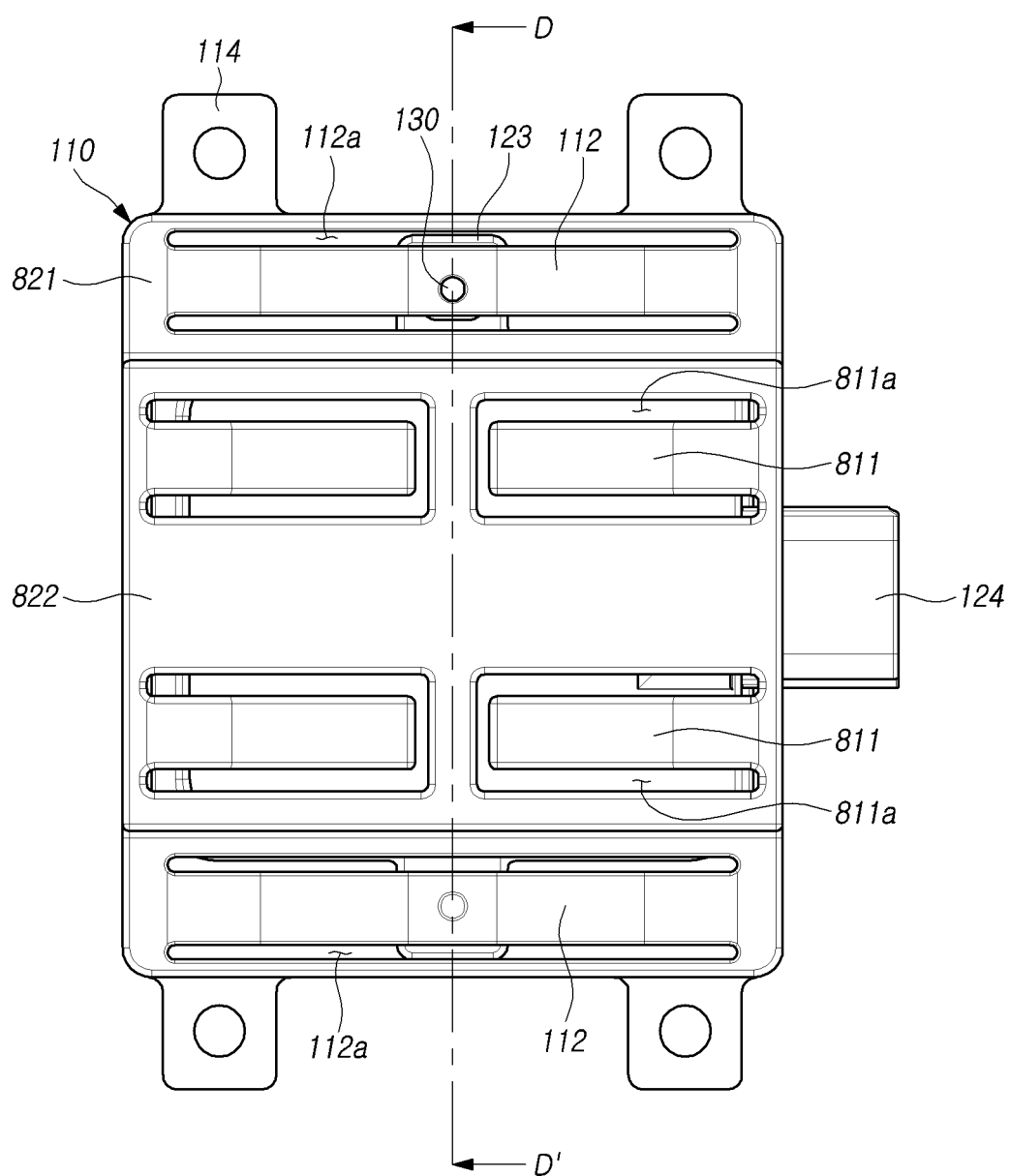
FIG. 12 is a rear view of the radar apparatus mounting assembly of FIG. 9.
Figure 13:
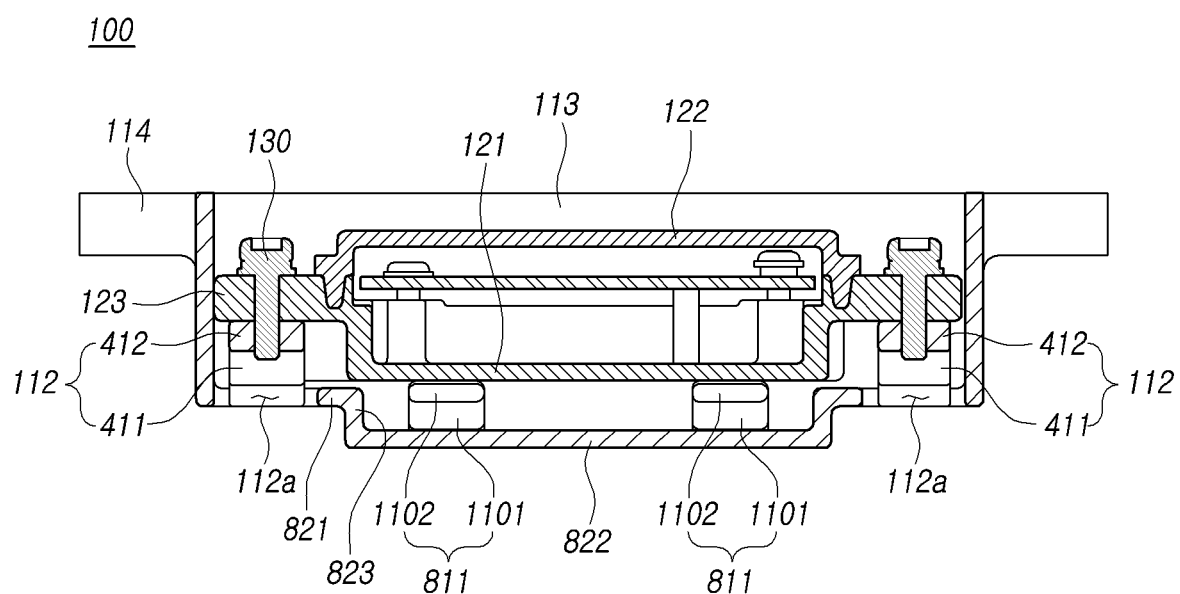
FIG. 13 is a cross-sectional view taken along with line D-D' of FIG. 12.

FIG. 1 is an exploded perspective view OF a radar apparatus mounting assembly in accordance with embodiments of the present disclosure. FIG. 2 is a perspective view of a structure of the radar apparatus mounting assembly of FIG. 1 in which a radar apparatus is combined with a bracket. FIG. 3 is a front view of at least a part of the radar apparatus mounting assembly of FIG. 1. FIG. 4 is a cross-sectional view taken along with line A-A' of FIG. 3. FIG. 5 is a front view of the radar apparatus mounting assembly of FIG. 2. FIG. 6 is a rear view of the radar apparatus mounting assembly of FIG. 5. FIG. 7 is a cross-sectional view taken along with line B-B' of FIG. 5. FIG. 8 is an exploded perspective view of a radar apparatus mounting assembly in accordance with embodiments of the present disclosure. FIG. 9 is a perspective view of a structure of the radar apparatus mounting assembly of FIG. 8 in which a radar apparatus is combined with a bracket. FIG. 10 is a front view of at least a part of the radar apparatus mounting assembly of FIG. 8. FIG. 11 is a cross-sectional view taken along with line C-C' of FIG. 10. FIG. 12 is a rear view of the radar apparatus mounting assembly of FIG. 9. FIG. 13 is a cross-sectional view taken along with line D-D' of FIG. 12.

The radar apparatus mounting assembly 100 in accordance with embodiments of the present disclosure includes a radar apparatus 120, and a bracket 110 including a rear portion 111 facing a rear surface of the radar apparatus 120, and a first elastic portion 112 bent from the rear portion 111 and coupled to the radar apparatus 120, and installed in a vehicle.

In some embodiments, the rear portion 111 may indicate at least one rear surface of the bracket 100, or a portion placed in a lower portion of the bracket 110.

The radar apparatus 120 may include a housing 121 accommodating a circuit board (as shown in FIG. 7) and a radome 122 coupled to the housing 121. Further, an antenna is mounted on the circuit board, and electromagnetic waves can be transmitted and received through the radome 122.

Referring to FIGS. 1 and 2, a bracket 110 is attached to a vehicle in combination with the radar apparatus 120. For example, the bracket 110 may be installed on a frame of a vehicle, or in an inside space of a front or rear bumper. For example, the radar apparatus 120 and the bracket 110 may be attached to the vehicle so that the radome 122 can face the outside of the vehicle, and can transmit electromagnetic waves to, or receive electromagnetic waves from, the outside of the vehicle.

The radar apparatus 120 may have an approximately rectangular shape as shown in the drawings, and likewise, the bracket 110 may have an approximately rectangular shape. However, this is merely one desired example of possible shapes; therefore, embodiments of the present disclosure are not limited thereto.

Together with a lateral portion 113 described below, the rear portion 111 enables the performance of the radar apparatus 120 to be enhanced by reflecting or absorbing electromagnetic waves. The first elastic portion 112 can protect the radar apparatus 120 from impact and prevent a corresponding detection area from being changed. In some embodiments, the lateral portion 111 may indicate at least one lateral surface of the bracket 100, or a portion placed in a lateral edge of the bracket 110.

The bracket 110 can reflect electromagnetic waves by being made of a metal material, such as steel, aluminum, or the like, or can absorb electromagnetic waves by being made of a plastic material including carbon nanotubes, or the like.

That is, by allowing the bracket 110 to include the rear portion 111, and the lateral portion 113 protruding from an edge of the rear portion 111 and surrounding the radar apparatus 120, lateral and rear portions of the radar apparatus 120 coupled with the bracket 110 are shielded by the bracket 110 except for a front portion in which the radome 122 is installed, and in turn, this shielding leads the radar apparatus 120 to transmit or receive electromagnetic waves only in the front direction in which the radome 122 faces. Therefore, noises can be reduced and detection performance can be enhanced.

Accordingly, in a preferred embodiment, a height of the lateral portion 113 protruding from the edge of the rear portion 111 may be greater than a thickness of the radar apparatus 120.

Further, the bracket 110 may include a fixing portion 114 protruding from an exterior of the lateral portion 113 and coupled to a vehicle.

In some embodiments, a plurality of fixing portions 114 may be arranged in the lateral portion 113; thus, allow the bracket 110 to be coupled stably to a vehicle.

For example, the bracket 110 may be coupled to the vehicle by bolts passing through the fixing portions 114.

Further, as shown in drawings, the fixing portion 114 may be located on an edge of the lateral portion 113, that is, an edge of opposite portion of the rear portion 111; thus, the bracket 110 may be easily coupled on an inner surface of the bumper.

That is, since the radar apparatus 120 is installed so that the radome 122 can directly face the inner surface of the bumper, the number of components that electromagnetic waves transmit can be reduced, and in turn, corresponding noises can be reduced.

Further, the lateral portion 113 may be provided with an opening portion 115 in which a wall protruding from the rear portion 111 is stepped and recessed. A connector 124 of the radar apparatus 120 may be accommodated in the opening portion 115, and electrical signals can be transmitted or received between the radar apparatus 120 and other components or devices via the connector 124.

That is, the connector 124 may extend beyond an exterior of the bracket 110 so that the connector 124 can be exposed.

Next, referring to FIGS. 3 and 4, the first elastic portion 112 protecting the radar apparatus 120 from impact may include a first support portion 412 coupled to the radar apparatus 120 and a first bending portion 411 connecting between the first support portion 412 and the rear portion 111.

As the first elastic portion 112 is elastically deformed, the radar apparatus 120 can be protected from impact by absorbing an impact applied to a vehicle, and thereafter, as the first elastic portion 112 is restored, a corresponding detection area can be prevented from being changed by causing the radar apparatus 120 to be returned to an initial position.

That is, since the rear portion 111 of the bracket 110 is located to face the rear surface of the radar apparatus 120 and to be spaced apart by a predetermined distance, when an impact is applied to a vehicle, a movable range of the first elastic portion 112 can be secured by the spaced distance. Thereby, as the first elastic portion is elastically deformed within the movable range and thereafter, restored, the radar apparatus 120 can be protected from impact, and a corresponding detection area can be prevented from being changed.

The first bending portion 411 may be formed to be bent in a direction from the rear portion 111 toward the rear surface of the radar apparatus 120, and the first support portion 412 may be formed to extend in a direction parallel to the rear portion 111 from an end of the first bending portion 411.

Further, the first support portion 412 may be interposed between two parts of the first bending portion 411. In other words, the first bending portion 411 may include the two parts that are symmetrically located on one side and the other side of the first support portion 412.

That is, the first elastic portion 112 may include two first bending portions 411, and the first bending portion 412 may be located between the two first bending portions 411.

Since the first bending portions 411 are symmetrically located, when an impact is applied to a vehicle, a movement of the radar apparatus 120 can be stably buffered and the impact can be absorbed.

In order to secure the movable range of the first elastic portion 112 and reduce an associated weight, a first elongated hole 112a may be formed in the rear portion 111.

That is, the first elongated hole 112a may be formed to be elongated in a longitudinal direction of the first elastic portion 112, and the first bending portions 411 may be located in both end portions of the first elongated hole 112a.

Further, referring to FIGS. 5 and 6, two first elastic portions 112 may be arranged to be spaced apart from each other in the rear portion 111, and the radar apparatus 120 may be located between the first elastic portions 112.

That is, the radar apparatus 120 can be protected from an impact applied to a vehicle by being coupled to two first elastic portions 112. As shown in drawings, the first elastic portions 112 are arranged to be spaced apart on an upper portion and a lower portion of the radar apparatus 120; thus, the radar apparatus 120 may be located between the first elastic portions 112.

Further, referring to FIG. 7, the radar apparatus 120 may include a coupling portion 123 protruding from a lateral surface thereof and coupled to the first support portion 412, and the radar apparatus 120 and the first elastic portion 112 may be coupled by a coupling element 130 passing through the coupling portion 123 and the first support portion 412. Here, the coupling element 130 may include, not limited to, screws, bolts, nuts, pins, keys, locking rings, snap rings, or the like.

Meanwhile, referring to FIGS. 8 and 9, the bracket 110 may include a second elastic portion 811 bent from the rear portion 111 and supported by the radar apparatus 120.

That is, since the radar apparatus 120 is elastically supported by the second elastic portion 811 by supported by, or supporting, the radar apparatus 120, as well as the first elastic portion 112 coupled to the radar apparatus 120, when an impact is applied to a vehicle, an amount of impact absorbed by the first elastic portion 112 and the second elastic portion 811 may increase, and thus, the radar apparatus 120 can be safely protected.

Further, referring to FIGS. 10 and 11, the rear portion 111 may include a back portion 822 that is formed to be stepped and recessed, and the second elastic portion 811 may be located in the back portion 822.

That is, the rear portion 111 may include a front portion 821 in which the first elastic portion 112 is located, the back portion 822 in which the second elastic portion 811 is located, and a stepped portion 823 formed between the front portion 821 and the back portion 822.

As shown in drawings, although it is desirable for the second elastic portion 811 to be located between first elastic portions 112 spaced apart from each other. as described above, while the first elastic portion 112 is coupled to the coupling portion 123 protruding from a lateral surface of the radar apparatus 120, as the second elastic portion 811 is supported by the rear surface of the radar apparatus 120, the second elastic portion 811 may be located in the back portion 822 in order to secure a movable range of the second elastic portion 811.

Further, the second elastic portion 811 may include a second support portion 1102 by supported by, or supporting, the radar apparatus 120, and a second bending portion 1101 connecting between the second support portion 1102 and the rear portion 111.

The second elastic portion 811 is located in the back portion 822 of the rear portion 111; thus, the second bending portion 1101 is allowed to connect between the second support portion 1102 and the back portion 822.

Accordingly, when an impact is applied to a vehicle, the impact can be absorbed firstly as the first elastic portion 112 coupled to the radar apparatus 120 is elastically deformed, and the impact can be absorbed secondly by the second elastic portion 811 supported by the rear surface of the radar apparatus 120. Therefore, the radar apparatus 120 can be protected, and a corresponding detection area can be prevented from being changed by allowing the restoring of the first elastic portion 112 and the second elastic portion 811 to lead the radar apparatus 120 to be returned to an initial position.

Similar to the first elongated hole 112a, in order to secure a movable range of the second elastic portion 811 and reduce an associated weight, a second elongated hole 811a may be formed in the rear portion 822.

That is, the second elongated hole 811a may be formed to be elongated in a longitudinal direction of the first elastic portion 811, and the second bending portions 1101 may be located in end portions of the second elongated hole 811a.

Further, referring to FIGS. 12 and 13, two or more second elastic portions 811 may be located, and the second elastic portions 811 may be located so that second support portions 1102 can face each other.

As described in drawings, the second elastic portion 811 located between the first elastic portions 112 may be located to be parallel to the first elastic portion 112, or two or more second elastic portions 811 may be arranged on a pair of two basis so that second support portions 1102 can face each other.

Further, the second elastic portion 811 may be located between the first elastic portions 112 and spaced apart from each of the first elastic portions 112; therefore, an amount of impact absorbed by the first and second elastic portions may increase, and in turn, the radar apparatus 120 can be safely protected.

The number of the second elastic portions 811, and the like may be appropriately adjusted taking account of sizes of the radar device 120 and the bracket 110.

The radar apparatus mounting assembly in accordance with the embodiments as described above can protect the radar apparatus from an impact applied to a vehicle and prevent a corresponding detection area from being changed by absorbing the impact through the elastic structure of the bracket installed in a vehicle in combination with the radar apparatus.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar apparatus mounting assembly comprising:
   a radar apparatus including
      a housing,
      a circuit board having an antenna mounted thereon and accommodated in the housing, and
      a radome coupled to the housing to cover the circuit board; and
   a bracket configured to be coupled to a vehicle and including
      a rear portion facing a rear surface of the housing, and
      a first elastic portion bent from the rear portion and coupled to the housing,
   wherein the first elastic portion includes a first support portion coupled to the radar apparatus, and a first bending portion connecting between the first support portion and the rear portion.

2. The radar apparatus mounting assembly according to claim 1, wherein the bracket is made of a metal material or a plastic material including carbon nanotubes.

3. The radar apparatus mounting assembly according to claim 1, wherein the bracket includes a front portion which is opened to which the radome of the radar apparatus faces.

4. The radar apparatus mounting assembly according to claim 1, wherein the bracket includes a lateral portion protruding from an edge of the rear portion and surrounding the radar apparatus.

5. The radar apparatus mounting assembly according to claim 2, wherein the bracket includes a fixing portion protruding from an exterior of the lateral portion and coupled to the vehicle.

6. The radar apparatus mounting assembly according to claim 4, wherein the lateral portion includes an opening portion in which a wall protruding from the rear portion is stepped and recessed, and in which a connector of the radar apparatus is accommodated.

7. The radar apparatus mounting assembly according to claim 1, wherein the rear portion is spaced apart from the rear surface of the radar apparatus.

8. The radar apparatus mounting assembly according to claim 1, wherein the rear portion includes a first elongated hole formed at the rear side of the first elastic portion.

9. The radar apparatus mounting assembly according to claim 1, wherein the first bending portion includes two parts that are symmetrically located on one side and the other side of the first support portion.

10. The radar apparatus mounting assembly according to claim 1, wherein the first elastic portion includes two first elastic portions arranged to be spaced apart from each other in the rear portion, and the radar apparatus is located between the two first elastic portions.

11. The radar apparatus mounting assembly according to claim 1, wherein the radar apparatus includes a coupling portion protruding from a lateral surface of the radar apparatus and coupled to the first support portion.

12. The radar apparatus mounting assembly according to claim 11, wherein the radar apparatus and the first elastic portion are coupled by a coupling element passing through the coupling portion and the first support portion.

13. The radar apparatus mounting assembly according to claim 1, wherein the bracket includes a second elastic portion bent from the rear portion and supported by the radar apparatus.

14. The radar apparatus mounting assembly according to claim 13, wherein the rear portion includes a second elongated hole formed at the rear side of the second elastic portion.

15. The radar apparatus mounting assembly according to claim 13, wherein the rear portion includes a back portion that is formed to be stepped and recessed, and the second elastic portion is located in the back portion.

16. The radar apparatus mounting assembly according to claim 13, wherein the second elastic portion includes a second support portion supported by the radar apparatus, and a second bending portion connecting between the second support portion and the rear portion.

17. The radar apparatus mounting assembly according to claim 13, wherein the second elastic portion is located to be parallel to the first elastic portion.

18. The radar apparatus mounting assembly according to claim 13, wherein the second elastic portion includes two or more second elastic portions.

19. The radar apparatus mounting assembly according to claim 18, wherein at least two of the two or more of the second elastic portions are arranged such that second support portions face each other.

* * * * *